United States Patent [19]
Wenk

[11] 4,128,918
[45] Dec. 12, 1978

[54] ADJUSTABLE SNAP-ON-CLAMP

[75] Inventor: Raymond C. Wenk, Crystal Lake, Ill.

[73] Assignee: Matrix IV, Inc., Woodstock, Ill.

[21] Appl. No.: 849,684

[22] Filed: Nov. 8, 1977

Related U.S. Application Data

[63] Continuation-in-part of Ser. No. 745,661, Nov. 29, 1976.

[51] Int. Cl.² .................. F16L 33/00; A44B 21/00
[52] U.S. Cl. .................. 24/16 R; 24/255 SL;
24/20 TT; 24/257; 285/DIG. 22
[58] Field of Search ......... 24/255 SL, 201 C, 249 SL,
24/16 PB, 248 SL, 81 CC, 30.5 P, 20 TT, 267
C, 237, 241 S, 16 R; 285/DIG. 22; 128/327

[56] References Cited
U.S. PATENT DOCUMENTS

| 3,229,998 | 1/1966 | Pennington | 24/255 SL |
| 3,605,200 | 9/1971 | Vallinotto | 24/255 SL |
| 3,809,371 | 5/1974 | Martini | 24/255 SL |
| 3,925,851 | 12/1975 | Bevans | 24/255 SL |
| 4,061,873 | 12/1977 | Berg | 24/255 SL |

FOREIGN PATENT DOCUMENTS 1559036 1/1969 France .................. 24/255 SL

Primary Examiner—Bernard A. Gelak
Attorney, Agent, or Firm—Hosier, Niro & Daleiden, Ltd.

[57] ABSTRACT

An improved snap-on-clamp is provided for securely fastening one object to another, such as fastening a flexible hose about a pipe, a nipple, or the like, and includes an open-ended, substantially annular band having formed at its ends a pair of opposed, interlockable members. Each interlockable member includes an arcuate jaw having a plurality of teeth which interlock with the teeth of the opposed member's jaw when the interlockable members are interengaged and the clamp is in a clamping position. Each interlockable member further includes resilient bias means spaced apart from its respective jaw to provide opposing forces to the interlocked jaws so that the plurality of teeth are forced together, thereby preventing separation of the interlockable members other than by transverse shear. The radially innermost resilient bias means includes a cantilevered tongue which is tapered to provide a substantially continuous and smooth inner circumferential clamp surface, thereby distributing pressure evenly about a clamped surface.

11 Claims, 10 Drawing Figures

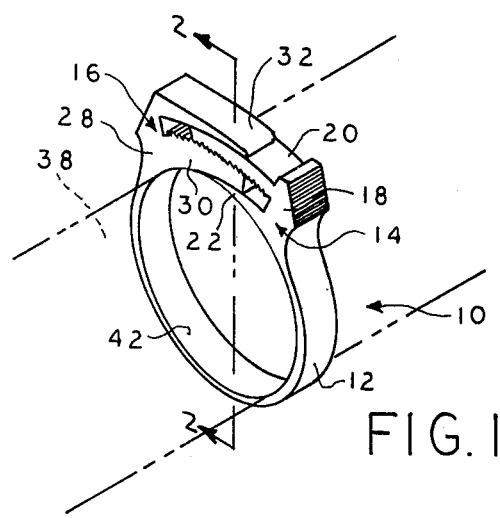
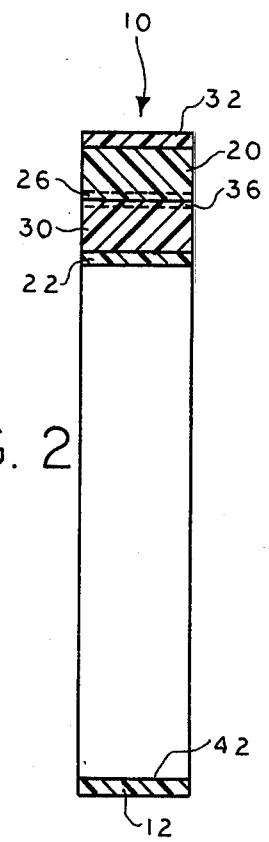
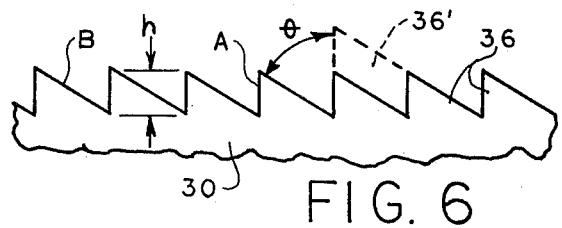
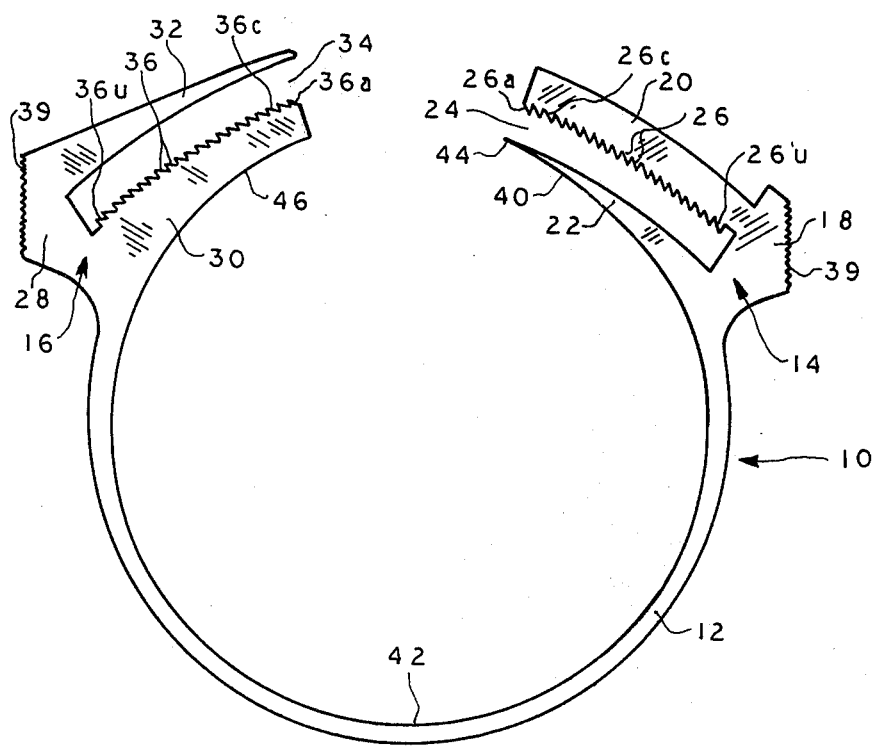
FIG. 1
FIG. 2
FIG. 6
FIG. 3

ADJUSTABLE SNAP-ON-CLAMP

RELATED APPLICATION

This is a continuation-in-part application of U.S. Ser. No. 745,661, filed Nov. 29, 1976, of Raymond C. Wenk.

BACKGROUND OF THE INVENTION

The present invention relates to adjustable clamps for securely fastening one object to another and more particularly to clamps for securely fastening a flexible hose about a pipe, a nipple, or the like, by means of an adjustable band which is adapted to be adjusted and closed by a pair of interlocking jaws. Specifically, the present invention relates to an improved snap-on clamp of the above type which is capable of withstanding high internal hose pressure, is adjustable to fit hoses having widely varying outer diameters for a given inner diameter hose size, and will conform and evenly apply pressure to the object being clamped.

In the construction and manufacture of apparatus which include gases or liquids flowing through partially flexible lines, installation of hose pieces between pipe connections is often necessary. In many cases, it is desirable to simply and quickly clamp the hose onto a nipple at the end of a pipeline. For purposes of servicing, repairing, or cleaning of such lines, it is also desirable to be able to disconnect the normally clamped-on hose without damaging either the hose or the clamp. Therefore, a removable clamp of simple construction and operation is necessary for such purpose.

It is another desirable feature in many instances to be able to re-use such clamps. In the automobile industry, for example, short flexible hose pieces are inserted into pipe connections which conduct air and liquids. It is also customary in the automotive industry to cover drive shafts by means of flexible, bellows-like hose pieces in order to protect the shafts against the environment. These hose pieces must generally be disconnected for purposes of repairs and/or servicing, and the ability to re-use the hose clamps would result in substantial cost savings. Conversely, it may also be desirable to clamp a hose onto a pipe or nipple in such a fashion that to disconnect the clamped hose could only be accomplished by destroying the clamp.

Heretofore, clamps for fastening a flexible hose onto a pipe, a nipple, or the like, have either been difficult and inconvenient to clamp, have not been adapted to securely clamp and hold the hose under conditions of high internal hose pressure, have not been readily removable, or have not been sufficiently adjustable for clamping hoses having virtually identical inner diameters but widely varying outer diameters.

Some examples of previous snap-on adjustable hose clamps are particular described in U.S. Pat. No. 3,605,200 and No. 3,925,851. The clamps disclosed in these two patents include open annular bands having interlocking jaw members at the ends of each band. While these prior clamps are adjustable and readily fastened about a flexible hose, they are limited with respect to the range of outer hose diameters which a single clamp is capable of being secured about. It has been recognized, in accordance with the present invention, however, that the limitations of such prior art clamps is due in part, to the tooth structure of the disclosed clamps, particularly with respect to the size and number of teeth in relation to the annular band configuration.

Such a limitation, of course, poses considerable problems since the manufacture of hoses is generally based on inner diameter sizing. Since such hoses fit over standard size nipples or pipe ends, the inner diameters of the hoses are generally maintained in accordance with strict size tolerances. The thicknesses and outer diameters of such hoses, however, generally do not have strict size tolerances and, therefore, vary widely for any given inner diameter size, even by as much as 0.09 inch and more. Furthermore, some high pressure hoses are necessarily quite thick and, therefore, have a large outer diameter in relation to their inner diameter. Thus, to meet all possible situations, users or installers of such hoses have been required in the past to stock perhaps as many as three different sizes of the prior snap-on hose clamps for any given inner diameter size of flexible hose. Obviously, such a procedure is costly. Furthermore, failure to maintain such a stock of prior art clamps has resulted in the inability at times to properly service certain situations where the available hose required a size of clamp which was out of stock or not stocked at all, even though other clamps suitable for the same inner diameter size hose were available.

Another problem with the aforementioned prior snap-on hose clamps has been the general inability to maintain the integrity of a hose connection under conditions of high internal hose pressures. It has also been recognized, in accordance with the present invention, that the configuration of the junction between the radially innermost tongue of one interlockable member and the jaw of the opposite interlockable member in such prior art hose clamps is such that the clamps tend to gather or pinch the hose material between the tongue and jaw as the clamps are tightened about a hose. In addition, pressure from the clamp is unevenly distributed about the hose thereby causing weak points in the clamped area. This has resulted at times in the inability of a clamped hose to withstand very high internal hose pressures in that the fluid carried within the hose has escaped through the gathered or pinched area. Thus, such prior snap-on hose clamps are inadequate in certain situations where high pressures, such as 200-300 psi or higher, are present within the clamped hose, and in some instances can fail at pressures as low as 15 psi.

SUMMARY OF THE INVENTION

The present invention, therefore, is directed to an improved snap-on clamp which overcomes the above-mentioned deficiencies of previously available hose clamps.

Particularly, it is one object of the present invention to provide an improved clamp having a simple and inexpensive construction for use in connecting hoses having widely varying outer diameters to a pipe and the like and is capable of being expeditiously contracted and expanded.

It is another object of the present invention to provide an improved clamp which is capable of securely holding a hose in clamped position under operating conditions of high internal hose pressure.

Yet another object of the present invention is to provide an improved snap-on clamp of the above type which is easily and selectively removable.

It is a further object of the present invention to provide an improved snap-on hose clamp which will not become detached from the associated hose by a scewing action.

The foregoing and other objects are realized in accordance with the invention by providing a snap-on clamp which includes an open-ended, substantially annular band having formed at its ends a pair of opposed, interlockable members. Each interlockable member includes an arcuate jaw and resilient bias means spaced apart from its associated jaw. Each jaw includes a plurality of teeth which interlock with the teeth of the opposed member's jaw when the interlockable members are interengaged and the clamp is placed in a clamping position. Each resilient bias means preferably includes a flexible cantilevered tongue arranged substantially parallel to its associated jaw. The cantilevered tongues formed on the opposed interlockable members provide opposing forces to the interlocked jaws so that the plurality of teeth are forced together, thereby preventing separation of the interlockable members other than by transverse shear.

The plurality of teeth on each jaw are sized and configured to provide an adjustable snap-on clamp having a preferred minimum change of diameter capability of about 0.09 inch with the interengagement of each tooth preferably being equal to approximately 0.010–0.014 inch in clamp diameter. Preferably, each jaw includes approximately 13–21 teeth, depending upon the size of hose which the clamp is designed to be utilized with, and desirably has a minimum three tooth engagement before the clamp is considered in its initial closed position.

The radially innermost disposed cantilevered tongue is longitudinally tapered toward its free outer end so that it is substantially flush with the radially inner surface of the opposed interlockable member's jaw when the clamp is in a closed position. This provides the clamp with a substantially continuous and smooth inner circumferential surface throughout the entire closing range of the clamp. The innermost cantilevered tongue is therefore not restricted as pressure is applied to the clamp to close it, the tongue sliding smoothly between the adjacent jaw and the object being clamped. This permits the clamp to evenly distribute pressure about the object, and when the object is a hose, this permits the clamp to withstand high internal hose pressure throughout the full diameter closing range of the clamp.

BRIEF DESCRIPTION OF THE DRAWINGS

The novel features which are believed to be characteristic of the present invention are set forth in the appended claims. The invention itself, however, together with further objects and attendant advantages thereof, will become apparent and best understood by reference to the following detailed description taken in connection with the accompanying drawings, setting forth by way of illustration and example certain embodiments of the invention in the several figures of which like reference numerals identify like elements, and in which:

FIG. 1 is a front perspective view of a clamp embodying the features of the present invention and illustrating the clamp in a closed position about a hose;

FIG. 2 is an enlarged cross-sectional view of the clamp taken substantially along line 2—2 of FIG. 1;

FIG. 3 is an enlarged side elevation view of the clamp shown in FIG. 1 and illustrating the clamp in an open position;

FIG. 6 is an enlarged, fragmentary side elevation view of a portion of the teeth on one jaw of the clamp and illustrating the size and angular relationships thereof;

DETAILED DESCRIPTION OF THE PREFERRED EMBODIMENT

Figure 4:
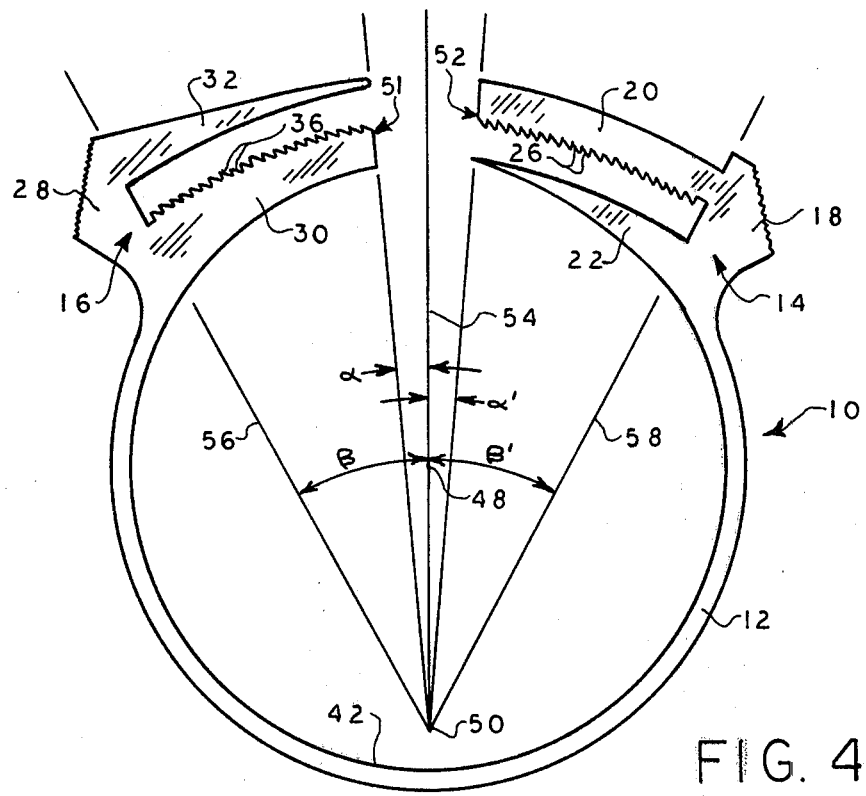
FIG. 4 is an enlarged side elevation view of the clamp similar to FIG. 3 but illustrating the clamp in its open position as molded and the angular relationships of the clamps which aid in producing the unique features of the present invention.

Referring now to FIGS. 1–3, there is illustrated a clamp 10 which embodies the novel features of the present invention. The clamp 10 includes an open-ended, substantially annular band 12 having a pair of integral, opposed interlockable members 14 and 16 disposed at its open ends. The clamp's inside surface 42 is continuously concave and substantially smooth or free of irregularities along the entire length of the band 12 and the interlockable members 14 and 16. The first interlockable member 14 includes a support element 18, an arcuate jaw 20, and resilient bias means which preferably consists of a flexible, cantilevered and tapered tongue 22. The tongue 22 is preferably spaced radially inwardly from and substantially parallel to the jaw 20 to form an opening 24 therebetween. A plurality of teeth 26 are disposed along the radially inner surface of the jaw 20 and project toward the tongue 22.

The second interlockable member 16 is similar to but reversely oriented from the interlockable member 14. The interlockable member 16 includes a support element 28, an arcuate jaw 30, and resilient bias means which preferably consists of a flexible, cantilevered and tapered tongue 32. The tongue 32 is preferably spaced radially outwardly from and substantially parallel to the jaw 30 to form an opening 34 therebetween. A plurality of teeth 36 are disposed along the radially outer surface of the jaw 30 and project toward the tongue 32. The plurality of teeth 26 and 36 are preferably substantially identical in number, shape and size except that the teeth 36 are oriented in a reverse direction from that of the teeth 26. This permits the teeth 26 and 36 to intermesh when the opposed interlockable members 14 and 16 are brought together to close clamp 10 in a clamping position.

As illustrated in FIG. 1, the clamp 10 is brought into a closed clamping position about a hose 38 by interengaging the opposed intelockable members 14 and 16. When the interlockable members 14 and 16 are interengaged in such a clamping position, the jaws 20 and 30 are received within the openings 34 and 24, respectively, thereby vertically off-setting the jaws 20 and 30 from one another with the teeth 26 interlocking with the teeth 36.

The size of the jaws 20 and 30 and the spacing of the openings 24 and 34 are such that the cantilevered tongues 22 and 32, which sandwich the interengaged jaws 20 and 30, provide opposing biasing forces against jaws 20 and 30 to positively interengage the teeth 26 and 36. Specifically, the tongue 22 provides a radially outwardly biasing force against the jaw 30, and the tongue 32 provides a radially inwardly biasing force against the jaw 20. In this manner, separation of the jaws 20 and 30 is prevented other than by a skewing action wherein the teeth 26 and 36 are moved horizontally or transversely across each other to provide a disengagement of the opposed interlocked members 14 and 16 by transverse shear.

To secure the clamp 10 about the hose 38, the clamp 10 is placed in an open, non-clamping position, as illustrated in FIG. 3, so that it encircles the hose 38, which has previously been placed over a pipe, a nipple, or the like. The free ends of the opposed interlockable members 14 and 16 are then brought together in proper alignment as described above, and pressure is applied to the serrated surfaces 39 on the support elements 18 and 28 to force the opposed members 14 and 16 together and interengage the teeth 26 and 36. Preferably, a conventional hand pliers is utilized to maximize the force exerted by the clamp 10 on the hose 38 to ensure maximum clamping of the hose connection.

Referring more particularly to FIG. 3, the cantilevered tongues 22 and 32 are both preferably tapered toward their free outer ends. However, the tongue 22 is the radially innermost disposed portion of the interlockable members 14 and 16 so that the radially inner surface 40 thereof forms part of the inner circumferential surface 42 of the clamp 10. One of the novel features of the present invention is that the cantilevered spring 22 is tapered toward its free end 44 a sufficient amount so that the end 44 is substantially flush with the radially inner surface 46 of the jaw 30 when the clamp 10 is in any closed position, as particularly illustrated in FIGS. 1 and 5. In this manner, the circumferential inner surface 42 of the closed clamp 10 is substantially continuous and smooth and contains no gaps or significant interruptions. This permits the tongue 22 to slide smoothly and unrestricted between the jaw 30 and the hose 38 as pressure is applied at the surfaces 39 to close the clamp 10 about the hose 38. This feature along with the continuous concavity of surface 42 results in an even distribution of clamping pressure about the hose 38 by the clamp 10 and avoids gathering or pinching of hose material as the clamp 10 is closed. The clamp 10 can thus withstand very high pressure operating conditions within the hose 38 throughout its full closing diameter range without failure or leakage, as further described below.

There are a number of interrelated factors or parameters pertaining to the clamp 10 which when balanced in proper relation result in the novel features and unexpected clamping results provided by the present invention. One such factor is the above-described construction and operation of the tapered cantilevered tongue 22 and the jaw 30. Another such factor or parameter is the tooth structure of the clamp 10. With reference to FIG. 6, which particularly illustrates the tooth structure of the jaw 30, each tooth 36 on the jaw 30 is in the form of a right triangle having a vertical surface A with a height h, and an inclined ramp surface B. The angle $\theta$ between the surfaces A and B is preferably 60°, although this angle can vary between about 45°–80°. If the angle $\theta$ is less than about 45°, the interengaged teeth 26 and 36 will tend to slip, and a tight clamp connection cannot be maintained. If the angle $\theta$ is greater than about 80°, interengagement of the teeth 26 and 36 will be quite difficult, and the teeth 26 and 36 will tend to wear quickly as well as possibly chip or break.

The height h of the side A is preferably about 0.030 inch for the clamps 10 of all sizes, although this can vary between about 0.012–0.045 inch. The clamps 10 which utilize the teeth 36 having a shorter height h within this range are generally designed for use with hoses constructed from soft material, such as silicon, and which are not generally intended for use under very high internal pressure conditions. Furthermore, the teeth 36 with a shorter height h will tend not to bite into such soft material. However, the clamps 10 which have teeth with a height h of less than about 0.012 inch are generally not capable of withstanding any significant internal pressure conditions within the clamped hose. In addition, if the height h is greater than about 0.045 inch, then the number of teeth per jaw 20 or 30 is significantly and undesirably reduced. For example, FIG. 6 illustrates a tooth 36 having a height h of about 0.030 inch. The tooth 36' indicated by the dotted line has a height h of about twice this size, or 0.060 inch. As can be readily seen, by increasing the height h of the tooth 36' to 0.060 inch, the number of teeth which could be located on the jaw 30 would be reduced by about one-half, and such reduction in the number of teeth would severely affect the fine adjustment characteristics of the clamp 10 as further described below.

The number of the teeth 26 and 36 disposed along each jaw 20 or 30, respectively, is related in part to the size of the teeth as described above. While the number of the teeth 26 or 36 may vary between 9 and 24 per jaw 20 or 30, each jaw 20 and 30 preferably carries 13–21 teeth per jaw, the jaws 20 and 30 of each clamp 10 carrying the same number of teeth. The above-described interrelationship between size and number of teeth per jaw permit the diameter of each clamp 10 to vary by 0.005–0.020 inch, and preferably by 0.010–0.014 inch, for each engagement or disengagement of a tooth 36 with a tooth 26. These small incremental changes or fine adjustment characteristics in clamp diameter permit the clamp 10 of the present invention to provide a maximum pressure about the clamped hose 38 thereby providing maximum resistance to high internal pressure within the hose 38 and against external movement or twisting of the hose 38 without affecting the hose connection.

For example, if larger and fewer teeth than described above are utilized on such a snap-on clamp, interengagement of, for instance, 4 pairs of such teeth may not provide sufficient clamping force to resist high internal hose pressures, yet interengagement of 5 pairs of such teeth could not be achieved due to the size of the teeth and the outer diameter of the hose. Thus, the maximum extent to which such a clamp could be closed would be inadequate under such conditions. The clamp 10 of the present invention, however, could provide the required greater clamping pressure due to the incremental clamp diameter changes available.

Figure 5:
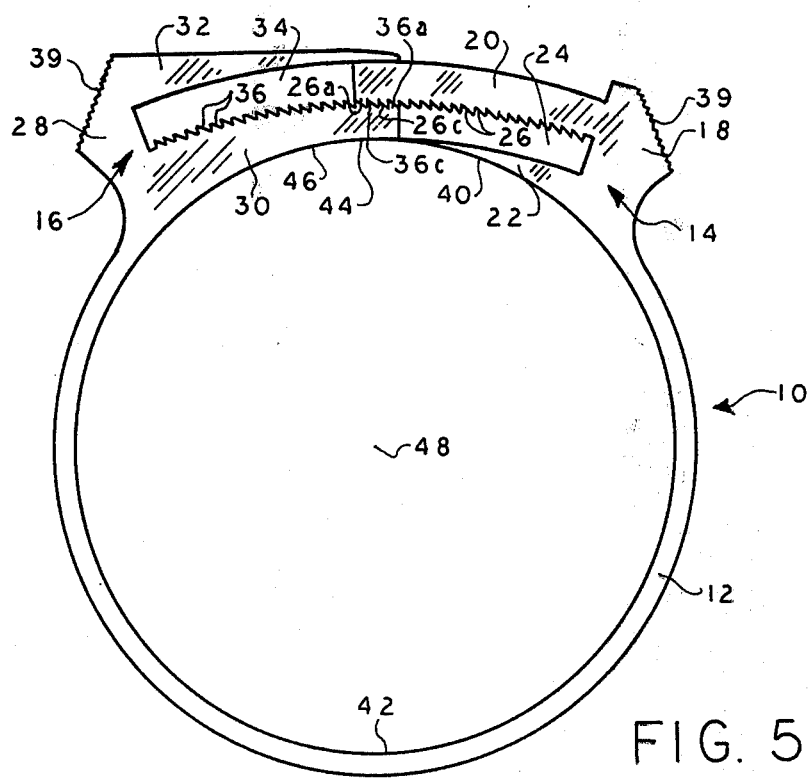
FIG. 5 is an enlarged side elevation view of the clamp similar to FIG. 3 but illustrating the clamp in its initial closed position with three pairs of teeth interlocked.

With particular reference to FIGS. 3 and 5, another aspect of the interlockable members 14 and 16 which is related to the above-described tooth structure is the total clamp diameter change available for a given individual clamp 10. Given the size and number of the teeth 26 and 36 as described above, the total diameter closing range of the clamp 10 may vary between about 0.060–0.500 inch and is preferably about 0.090–0.375 inch. The initial closed position of the clamp 10 is illustrated in FIG. 5 and requires that at least the first three pairs of the teeth 26 and 36 be interengaged. Preferably, the initial closed position includes the interengagement of the teeth 26a–c with the teeth 36a–c. It has been recognized that the interengagement of only 1 or 2 pairs of teeth will not provide sufficient holding power when internal hose pressures are elevated, and therefore the clamp 10 is not considered closed until at least the first three pairs of teeth are interlocked.

The total diameter range of the clamp 10 as stated above is from the initial closed position of the clamp 10 to the maximum closed position which includes the interengagement of the tooth 26a within the tooth 36u, and the tooth 26u with the tooth 36a. Thus, in the preferred embodiment, a hose 38 can vary in outer diameter size by as much as 0.375 inch for any given inner diameter size, yet a single size clamp 10 is still capable of securely connecting the hose 38 to a pipe or the like.

Referring now to FIGS. 4 and 5, another feature of the present invention which is interrelated to the previously described features is the basic circular form of the clamp 10 when the clamp is intended for use as a hose clamp. As previously indicated, the inner circumferential surface 42 of the closed clamp 10 is substantially continuous and smooth. Furthermore, when the clamp 10 is in its described initial closed position as shown in FIG. 5, the annular band 12 is in a substantially true circular form with the center of such circle being coaxial with the central axis of the band 12 as indicated at 48. Thus, the circumferential surface 42 of the closed clamp 12 forms a substantially true circle, and this aspect is quite important as further discussed below. As the clamp 10 is closed beyond its initial closed position so as to decrease the diameter of the clamp 10, the clamp 10 is deformed somewhat from its initial true circular configuration. However, the walls of the band 12 are designed to retain sufficient flexibility so that the shape of the clamp 10 will basically conform to the circular shape of the hose 38 as the clamp 10 is continued to be closed. Thus, pressure from the clamp 10 is applied and distributed evenly about the hose 38 throughout its entire closing range, and this aids in enabling the clamp 10 to withstand high internal hose pressure.

Although the clamps of the subject invention can be made from a variety of injection moldable plastic or thermoplastic materials, it has been found that the preferable materials for most applications have a relatively high heat resistance, high tensile and impact strengths at both high and low temperatures and are chemically resistant. In addition, the materials selected are desirably both flexible and resilient. Without flexibility, for example, the resultant clamps do not readily conform to the shape of the object to be clamped. Similarly, clamps made from non-resilient materials do not have the ability to apply and maintain the desired biasing forces against the jaws to insure the desired firm tooth interengagement.

Included among the flexible, resilient plastic materials useful in making clamps of the present invention are nylon, polyesters, glass-filled nylon, styrene copolymers, polystyrene, polypropylene, ehteylene-propylene copolymers, acrylonitrile-butadiene-styrene copolymers, polycarbonates, ethylene-vinyl acetate copolymers, copolymers of vinyl chloride with various monomers, polysulfone and various other known thermoplastics sold under such trademarks as "Noryl" and "Valox" resins. It has been found that flexible, resilient nylon offers the desired balance of heat and chemical resistance, and tensile and impact strength, and is a particularly preferred material for use in making clamps of the present invention.

The clamp 10 is constructed by standard injection molding techniques. However, it has been recognized that by arranging the mold so as to establish certain angular relationships for the clamp 10 in its molded position, the aforementioned features of tooth construction and clamp closing ranges which produce the unexpected clamping results of the present invention may be readily produced. As indicated above, the clamp 10 is designed so that the band 12 is in a substantially true circular form having a true center at 48 when the clamp 10 is in its initial closed position, as illustrated in FIG. 5. However, the clamp 10 must be molded in an open position. Referring to FIG. 4 wherein the clamp 10 is illustrated in its molded position, when the ends 50, 52 of the interlockable members 14, 16, respectively, are in a spread apart position so as to deform band 12, a new center or real center point 50 is formed and is located away from the interlockable members 14, 16 below the true center 48. The angles $\alpha$ and $\alpha'$ represent the degree of spread of each end 50, 52, respectively, from the center point 50 and a center line 54 connecting the points 48 and 50. While the angles $\alpha$ and $\alpha'$ may each vary from 2°–15°, $\alpha$ and $\alpha'$ are each preferably about 5° resulting in a total spread between the ends 50 and 52 of about 10°.

To determine the size of the jaws 20 and 30 and thereby the area in which a desired number of teeth 26 and 36 must be located, lines 56 and 58 are swung from the center point 50 away from the center line 54 at angles $\beta$ and $\beta'$, respectively. The lines 56 and 58 pass through the fixed ends of the jaws 20 and 30 which are secured to their respective support elements 18 and 28. While each angle $\beta$ and $\beta'$ may vary from 35°–48° from the center line 54, each angle $\beta$ and $\beta'$ is preferably 36°–45° depending on the desired overall size of the clamp 10 and the number of teeth 26, 36, thus establishing a total preferred spread between the fixed ends of the jaws 20 and 30 of 70°–96°. These angular relationships remain the same for all sizes of the clamps 10, and once the desired overall size of the clamp 10 is established, selection of the proper number and size of teeth within the aforementioned ranges can be readily made to obtain a clamp 10 having the unique clamping features and results of the present invention.

Thus, it is the recognition of and balance between these various factors and parameters which provide the unique clamping and holding ability of the present invention. It has been determined, for example, that nylon snap-on clamps constructed in accordance with the above can be installed and tested at 250 and 400 psi internal hose pressure and still maintain the hose connections without leakage or failure of the clamp. Furthermore, the above tests can be conducted with more than 20 inch pounds of torque applied to the clamps, yet the hose connections remain intact.

Although discussed in the context of hose clamps, it should be understood that the principles of the present invention can also be applied to provide an improved economical clamp capable of fastening, holding or clamping irregular shaped, eliptical shaped, or non-circular shaped objects such as capacitors to another object such as the wall of a cabinet base. In such instances the band of the clamp will conform and evenly apply pressure to various and numerous shapes yet will allow the firm application of required pressures for mounting, stablizing or securing the product or object to be clamped.

Figure 7:
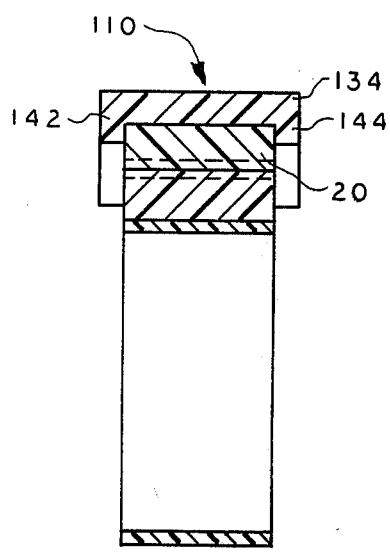
FIG. 7 is a cross-sectional view of a clamp similar to FIG. 2 but illustrating a first modification of the present invention.
Figure 8:
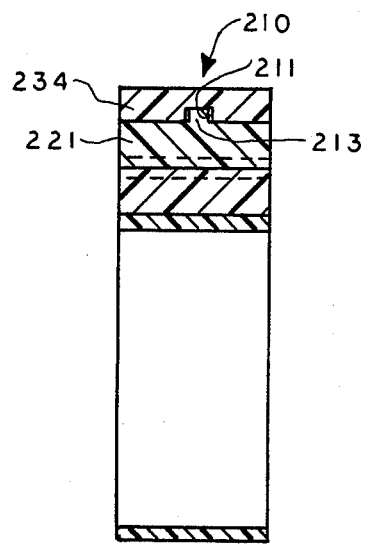
FIG. 8 is a cross-sectional view of a clamp similar to FIG. 4 but illustrating a second modification of the present invention.

As previously mentioned, the above-described clamps 10 may be readily disengaged by transverse shearing. This is performed most readily by utilizing common pliers or the like. However, there are certain instances wherein it is desirable that a clamp having the aforementioned clamping abilities and features not be readily removable or disengageable at all except by desctruction of the clamp. FIGS. 7 and 8 illustrate examples of such embodiments of the present invention.

In FIG. 7, a sectional view is shown of a snap-on clamp 110 in a clamping position. The operation and structure of the clamp 110 is the same as that of the clamp 10 described in the above-preferred form of the invention with the exception that the structure is slightly modified by including a radially upper cantilevered tongue 134 having flange portions 142 and 144. The flange portions 142 and 144 project radially toward the associated jaw 20 from the longitudinal sides of the tongue 134 so as to give the tongue 134 a general cross-sectional "U" shape. When in the clamping position, the flange portions 142, 144 prevent the jaw 20 from any movement in a horizontal plane so that any screwing action applied to the clamp 110 would not result in transverse shear and disengagement of the clamp 110.

Another modification of the invention is illustrated in FIG. 8 wherein is shown a sectional view of a clamp 210 engaged in a clamping position. The operation and structure of the clamp 210 is the same as that of the clamp 10 described in the aforementioned preferred form of the invention with the exception that the structure is slightly modified by including a rib 213 formed longitudinally along the radially outer surface of a jaw 221. The rib 213 interengages a groove 211 which is formed longitudinally along the radially inner surface of the radially outermost cantilevered tongue 234. When the clamp 210 is in a clamped position, the tongue 213 and the groove 211 interengage and prevent the separation or disengaging of the clamp 210 by transverse shear resulting from any skewing action.

Figure 9:
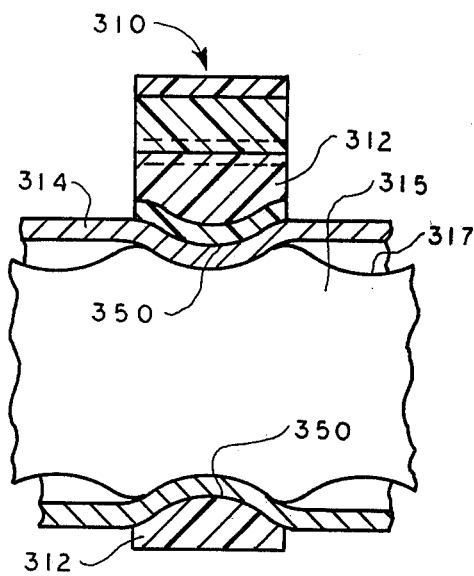
FIG. 9 is a cross-sectional view of a clamp similar to FIG. 4 but illustrating a third modification of the present invention with the clamp being enclosed about a hose and a section of pipe.

In another instance wherein a hose is fitted over a pipe end or the like which includes a groove or similar indentation, it may be desirable to conform the snap-on hose clamp of the present invention to such pipe shape to produce a tighter hose connection. FIG. 9 illustrates such an embodiment of the present invention. Turning to FIG. 9, a sectional view is illustrated showing a hose clamp 310 clamped about a hose 314 which is in turn enclosed about a pipe 315. The operation and basic structure of the hose clamp 310 is the same as the hose clamp 10 described above with the exception that the annular band 312 of the clamp 310 includes a convex surface 350. The surface 350 has an arc which is adapted to fit within a concave groove 317 disposed about the pipe 315. Thus, a more secure connection between the hose 314 and the pipe 315 is achieved.

Figure 10:
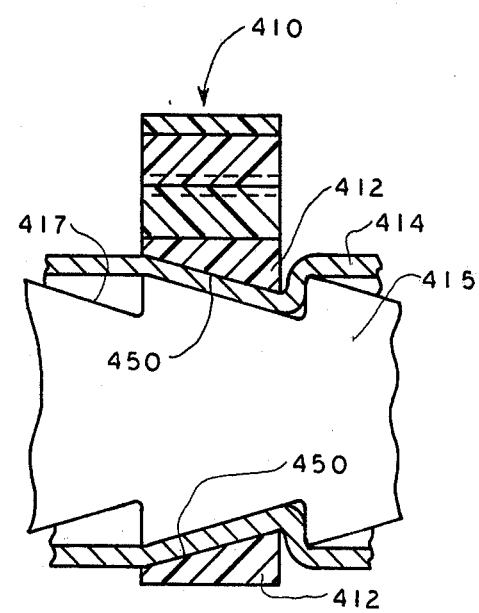
FIG. 10 is a cross-sectional view of a clamp similar to FIG. 9 but illustrating still a fourth modification of the present invention.

FIG. 10 illustrates a sectional view of yet a further embodiment of the invention. In this embodiment, an annular band 412 is the same as the band 12 of the above-described clamp 10 with the exception that the structure is somewhat modified to include a beveled-shaped inner circumferential surface 450 in the form of a truncated funnel. A pipe 415 has a similar-shaped externally indented surface 417 so that the band 412 fits securely within the indentation 417 to provide a more secure connection between the hose 414 and the pipe 415.

As can be seen from the above, an improved snap-on clamp has been provided whereby it has been recognized that by balancing certain factors and parameters of the clamp design, a clamp having unique features and unexpected clamping characteristics is provided. The snap-on clamp of the present invention is capable of being easily and tightly secured about a hose or other object and can withstand very high internal hose pressure without failing or leaking. Furthermore, the clamp of the present invention is able to accommodate hoses having widely varying outer diameters for a given inner diameter, and this feature reduces the stocking requirements for users. Finally, the clamp of the present invention is easily removed and can be re-used, yet the clamp will not become detached from the clamped hose or other object other than by transverse shear.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

I claim:

1. A clamp comprising an open-ended substantially annular band having a pair of opposed, interlockable members disposed at the open ends thereof; each said interlockable member including a support element and an arcuate jaw and resilient biasing means extending from the support element, each said jaw having a plurality of teeth oriented for interlocking engagement with the teeth of the other jaw and said biasing means developing opposing forces against said jaws to maintain said teeth in engagement when said opposed members are interlocked; each said biasing means comprising a cantilevered tongue tapering from a thick base portion proximate said support element to a flexible extremity; the entire inside surface of said clamp being continuously concave and substantially smooth to develop and distribute substantially uniform circumferential pressure about an object secured within said clamp.

2. The clamp as described in claim 1, wherein the radially innermost cantilevered tongue is sufficiently tapered and cooperates with the opposed interlockable member to form a substantially continuous inner circumferential surface in any closed position.

3. The clamp as described in claim 2, wherein said inner circumferential surface forms a substantially true circle with the central axis of said clamp being coincident with the center of said circle when the clamp is in a closed position comprising the interengagement of at least the first three of said plurality of teeth on each said jaw.

4. The clamp as described in claim 1, wherein each said jaw includes nine to twenty-four teeth, and the interengagement of each one pair of teeth on the jaws of opposed interlockable members reduces the diameter of said clamp by 0.005 to 0.020 inch.

5. The clamp as described in claim 1, wherein one of said cantilevered tongues includes a flange on both sides thereof projecting radially toward its associated jaw to prevent transverse disengagement of said teeth when said clamp is in a closed position.

6. The clamp as described in claim 1, wherein one of said jaws includes a longitudinal rib to engage a groove disposed longitudinally in the adjacent tongue of said opposed interlockable member when said clamp is in a closed position.

7. The clamp as described in claim 1, wherein said inside surface has a convex cross-section adapted to fit a concave groove in an object to which the clamp is secured.

8. The clamp as described in claim 1, where in said inside surface is beveled in the shape of a truncated cone.

9. The clamp as described in claim 3, wherein said clamp in its open position has the free ends of said interlockable members spaced 2°–15° relative to a real center point disposed below the true center of said clamp in said closed position, and the fixed ends of said jaws and said cantilevered tongues attached to said support elements are spaced 70°–96° relative to said real center point.

10. The clamp as described in claim 9, wherein each said jaw includes thirteen to twenty-one teeth, and the interengagement of each said one pair of teeth reduces the diameter of the clamp by 0.010–0.014 inch, and wherein the fixed ends of said jaws and said tongues are spaced 72°–90° relative to said real center point when the free ends of said opposed interlockable members are spaced approximately 10° relative to said real center point.

11. A clamp comprising an open-ended substantially annular band having a pair of opposed, interlockable members disposed at the open ends thereof; each said interlockable member including a support element and an arcuate jaw and resilient biasing means extending from the support element, each said jaw having a plurality of teeth oriented for interlocking engagement with the teeth of the other jaw and said biasing means developing opposing forces against said jaws to maintain said teeth in engagement when said opposed members are interlocked; each said biasing means comprising a cantilevered tongue tapering from a thick base portion proximate said support element to a flexible extremity; the inside surface of said clamp being substantially continuous and smooth when said clamp is in a closed position to distribute a substantially uniform clamping force about an object secured within said clamp.

* * * * *